United States Patent [19]

Sato et al.

[11] 4,380,377
[45] Apr. 19, 1983

[54] COMPACT ZOOM LENS

[75] Inventors: Yasuhisa Sato, Kawasaki; Sadahiko Tsuji, Yokohama, both of Japan

[73] Assignee: Canon Kabushiki Kaisha, Tokyo, Japan

[21] Appl. No.: 187,707

[22] Filed: Sep. 16, 1980

[30] Foreign Application Priority Data

Sep. 17, 1979 [JP] Japan .................. 54-119053

[51] Int. Cl.³ .................. G02B 9/64; G02B 15/18
[52] U.S. Cl. .................. 350/427
[58] Field of Search .................. 350/427, 423

[56] References Cited

U.S. PATENT DOCUMENTS

| | | | |
|---|---|---|---|
| 4,189,213 | 2/1980 | Iizuka | 350/423 |
| 4,223,981 | 9/1980 | Mizutani et al. | 350/423 |
| 4,240,699 | 12/1980 | Sato et al. | 350/423 |
| 4,307,943 | 12/1981 | Betensky et al. | 350/428 |

FOREIGN PATENT DOCUMENTS 2817633 11/1978 Fed. Rep. of Germany ...... 350/427

*Primary Examiner*—John K. Corbin
*Assistant Examiner*—Rebecca D. Gass
*Attorney, Agent, or Firm*—Toren, McGeady and Stanger

[57] ABSTRACT

A compact zoom lens comprising, from front to rear, a positive 1st group movable for focusing consisting of a positive doublet of negative and positive lenses and a positive singlet, a negative 2nd group movable for variation of magnification consisting of a negative singlet and a negative doublet of negative and positive lenses, a positive 3rd group movable for image shift compensation simultaneously with the second group consisting of a positive doublet of positive and negative lenses, and a relay lens of positive power consisting of 4th and 5th groups, the fourth consisting of at least one positive lens of forward convexity and a negative lens, and the fifth consisting of a negative meniscus lens of rearward convexity and a positive lens, the zoom lens satisfying the following conditions:

$$0.7 < \phi_{4,5}/\phi_4 < 0.85 \tag{1}$$

$$1.5 < \phi_{4s}/\phi_{4,5} < 2.2 \tag{2}$$

$$N_{4n} > N_{4p} \tag{3}$$

$$1.76 < N_{5n} < 1.85 \tag{4}$$

$$30 < \nu_{5p} < 45 \tag{5}$$

where $\phi_{4,5}$ is the overall refractive power of the 4th and 5th groups; $\phi_4$ is refractive power of the 4th group; $\phi_{4s}$ the refractive power of the first surface of the positive lens in the 4th group; N4p the refractive index of the positive lens or lenses in the 4th group; N4n the refractive index of the negative lens in the 4th group; N5n the refractive index of the negative lens in the 5th group; and $\nu_{5p}$ the Abbe number of the positive lens in the 5th group.

2 Claims, 30 Drawing Figures

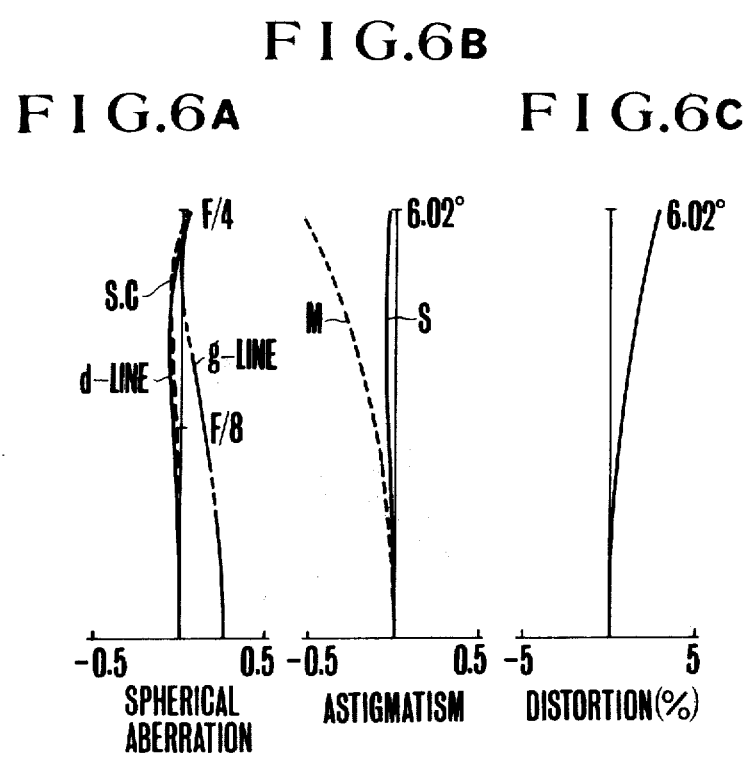

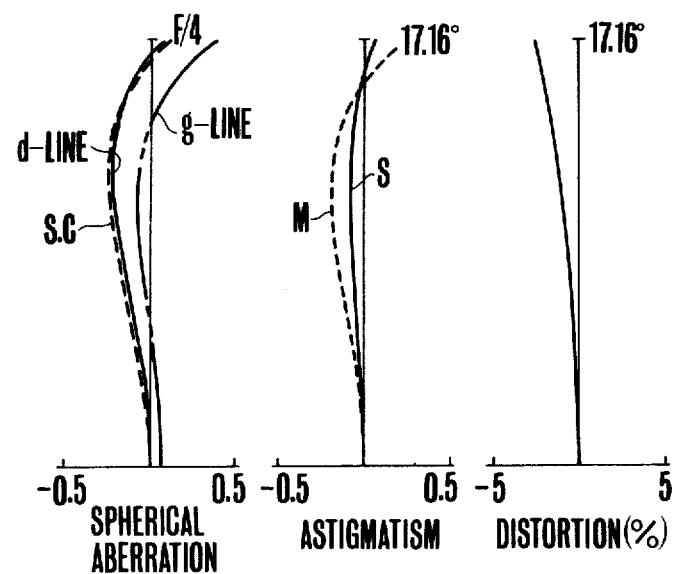
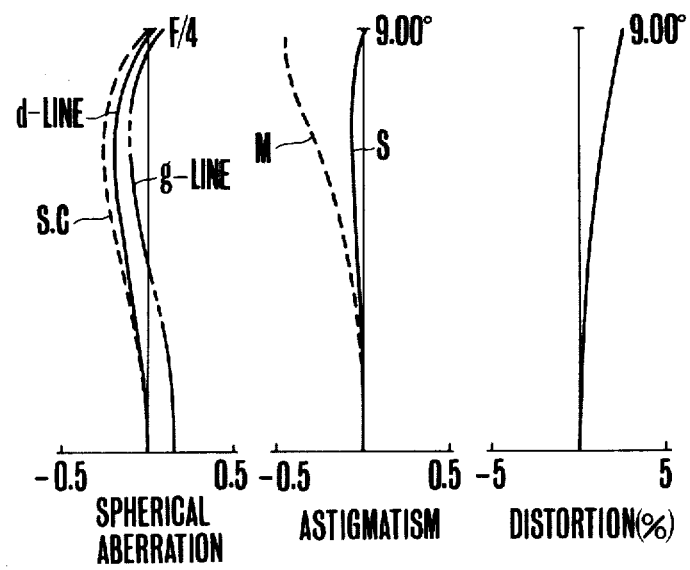

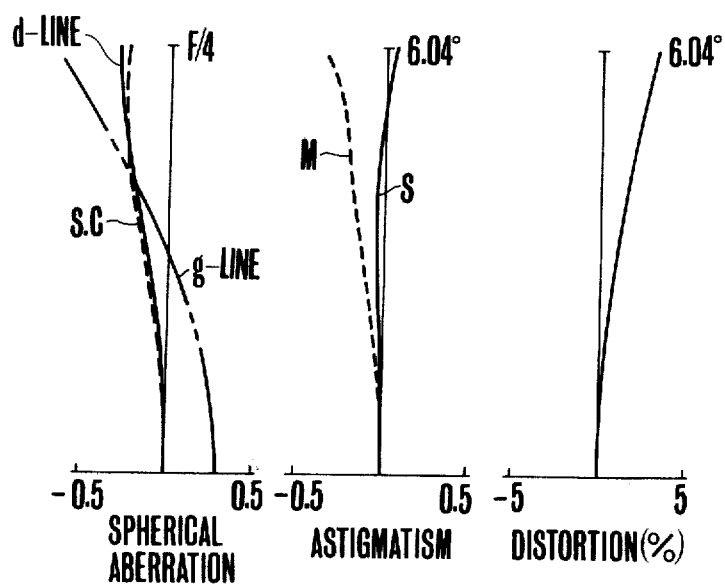

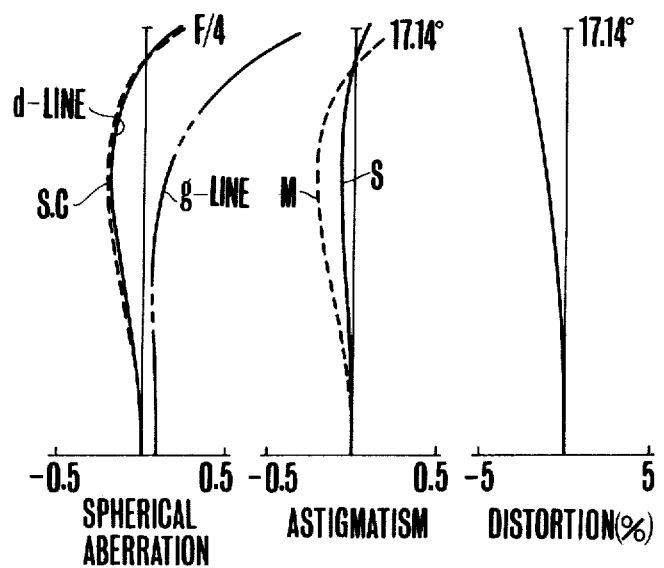
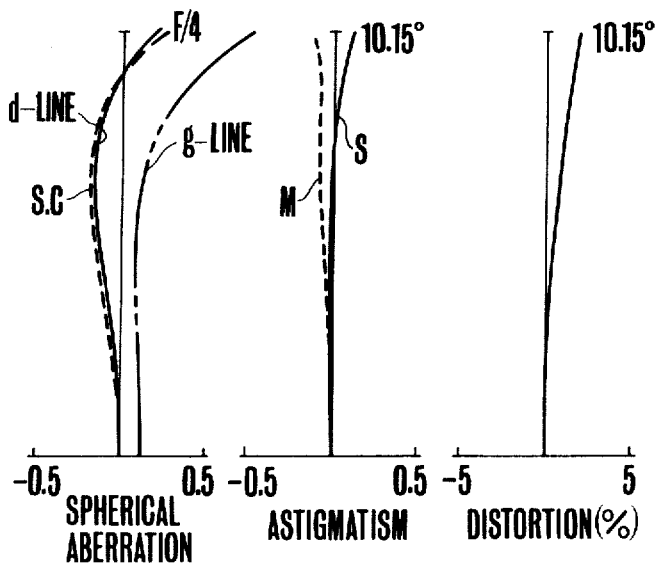

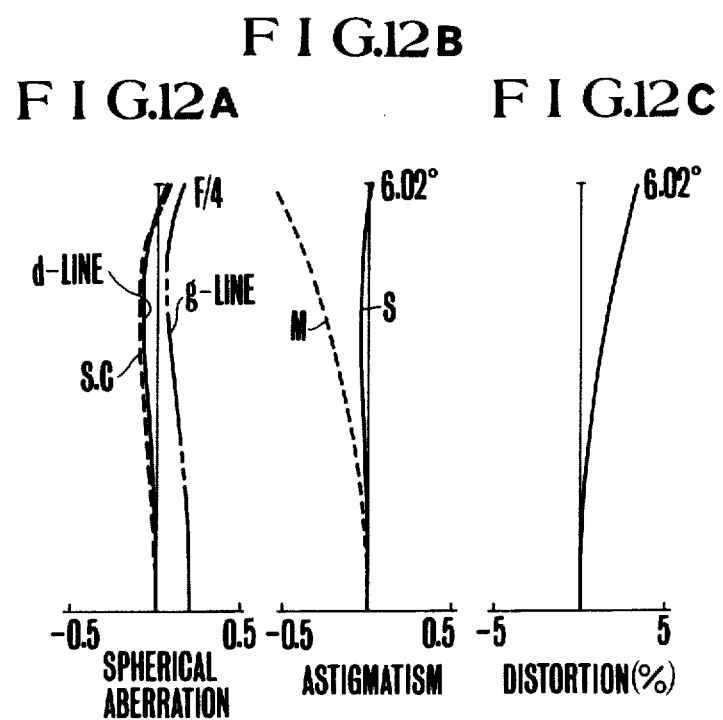

COMPACT ZOOM LENS

BACKGROUND OF THE INVENTION

1. Field of the Invention

This invention relates to telephoto zoom lenses having long focal lengths included in the zoom range thereof, and more particularly to improvements in compactness over the zoom lenses described in U.S. Pat. No. 4,094,586.

2. Description of the Prior Art

A conventional zoom lens there is composed of a 3-component front lens assembly of variable magnification power with a positive-negative-positive refractive power distribution in this order from the front, and a 2-component fixed rear assembly. The second component is axially moved to effect a change in the focal length of the entire system, while simultaneously moving the 3rd component along a path concave toward the front to effect the image shift compensation.

In general, this type of zoom lens when increased in zoom ratio and relative aperture calls for a very large increase in the physical length and the diameter of the front member thereof, thus tending to lack the compactness. In other words, the conventional zoom lenses such as those disclosed in Japanese Patent Laid-Open Publications Nos. Sho 53-131852 (German Patent Laid-Open Publication No. 2,817,633), Sho 49-899, Sho 51-37247 and Sho 51-63635 have ratios of the length from the front vertex to the focal plane to the longest focal length, or telephoto ratios, almost about unity, even at minimum, not exceeding the order of 0.97.

SUMMARY OF THE INVENTION

The present invention has despite a shortening of the physical length to provide a zoom lens with an extended zoom range and to achieve a good state of correction of the various aberrations.

When creating a compact zoom lens, it is first of importance to select an appropriate refractive power distribution. Or otherwise, no matter what lens configuration may be employed, the aberrational correction becomes difficult to perform. As far as the zoom lens of the type in which the axial movement of the 2nd component in one way is concurrent with the reciprocating axial movement of the 3rd component with the trace concave to the front is concerned, it is made possible by increasing the refractive power of the 2nd component with decrease in the amount of movement thereof to shorten the variable magnification assembly (1st to 3rd components), and by configuring the fixed assembly (4th and 5th components) to a telephoto type with the shortening of the fixed assembly itself to achieve a minimization of the total length. The shortening of the variable magnification assembly, however, results in increase of the individual refractive powers of the 1st to 3rd components and is, therefore, unfavourable to the achievement of good aberrational correction. The configuration of the fixed assembly to the telephoto type also results in a decrease of the telephoto ratio of the fixed assembly itself and a large value of the Petzval sum in negative sense. This leads to a difficulty of correcting the aberrations.

The present invention while shortening each of the variable magnification and fixed assemblies has succeeded in removing the resultant deterioration of the various aberrations by an appropriate glass arrangement and form selection. In this type zoom lens, it is particularly of the fixed assembly that the power distribution and the lens configuration are important in the point of view of the aberrational correction. With particular consideration at this point in mind, the present invention is to find out appropriate values for the refractive power, lens configuration and the refractive and dispersive indices of glasses of the fixed assembly so that a good correction of aberrations is facilitated.

BRIEF DESCRIPTION OF THE DRAWINGS

FIGS. 4, 5 and 6 are aberration curves of Example 1 in the wide angle, intermediate and telephoto positions respectively.
FIGS. 7, 8 and 9 are aberration curves of Example 2 in the wide angle, intermediate and telephoto positions respectively.
FIGS. 10, 11 and 12 are aberration curves of Example 3 in the wide angle, intermediate and telephoto positions respectively.

DETAILED DESCRIPTION OF THE PREFERRED EMBODIMENTS

Figure 1:
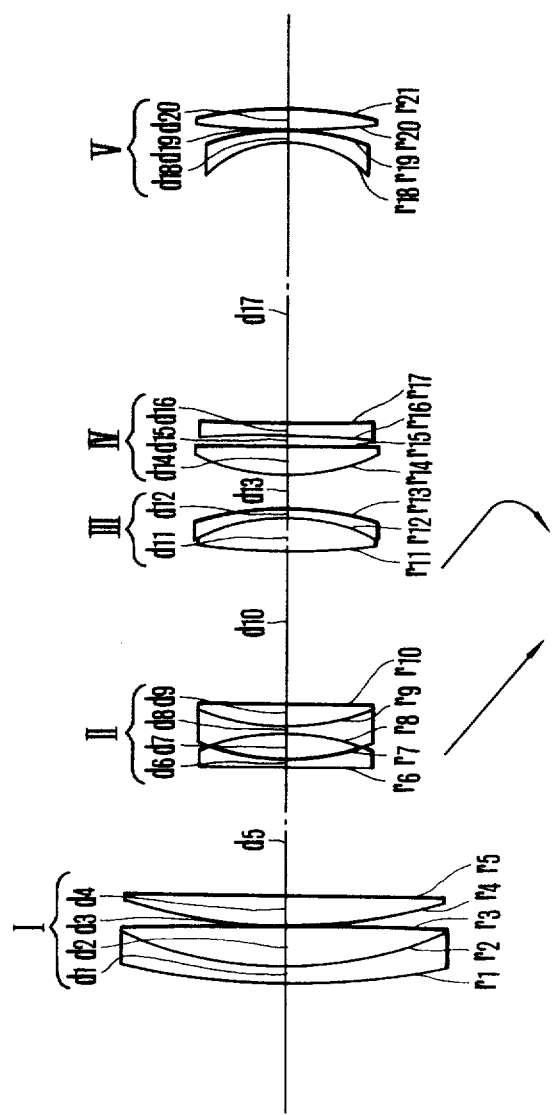
FIG. 1 is a lens block diagram of Example 1.
Figure 2:
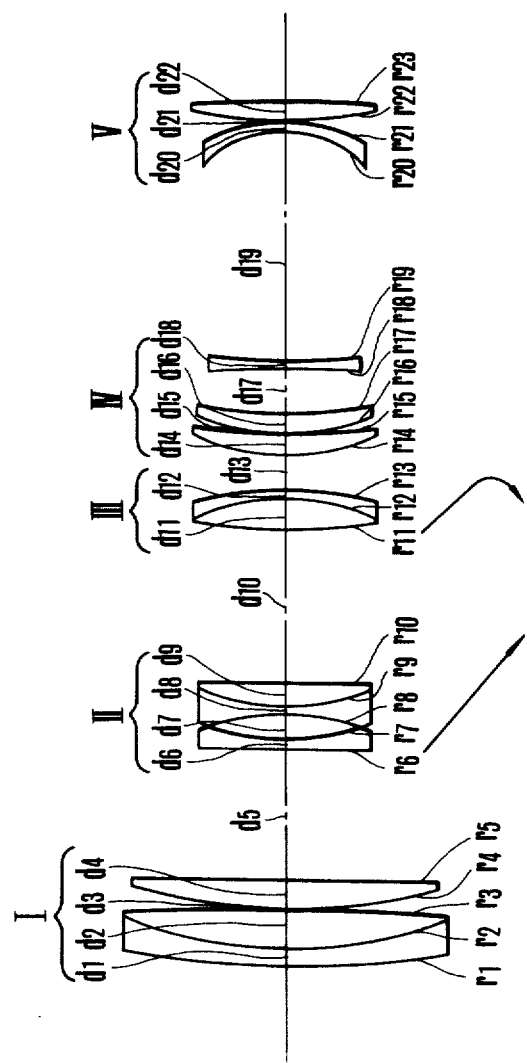
FIG. 2 is a lens block diagram of Example 2.
Figure 3:
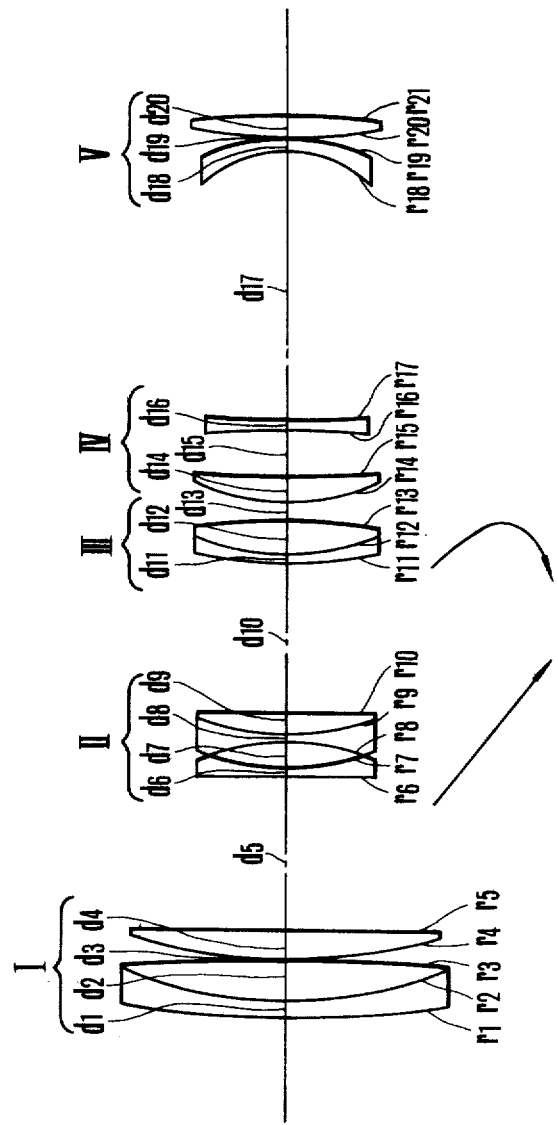
FIG. 3 is a lens block diagram of Example 3.
Figures 4A, 4B, 4C:
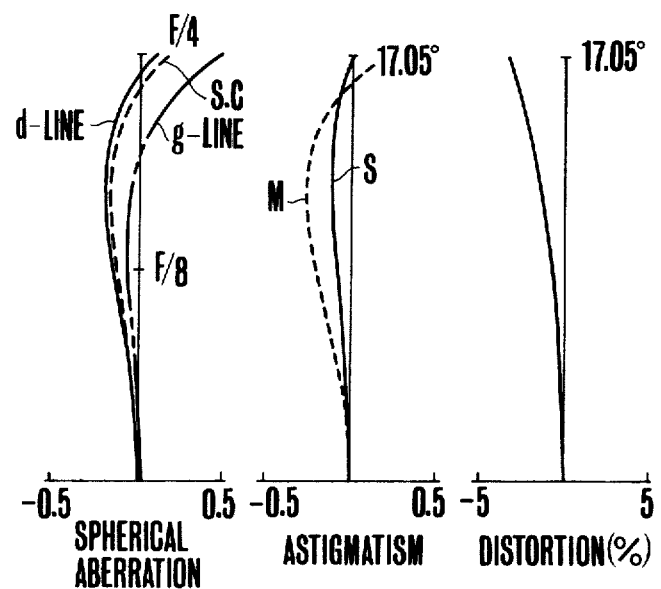
Figures 5A, 5B, 5C:
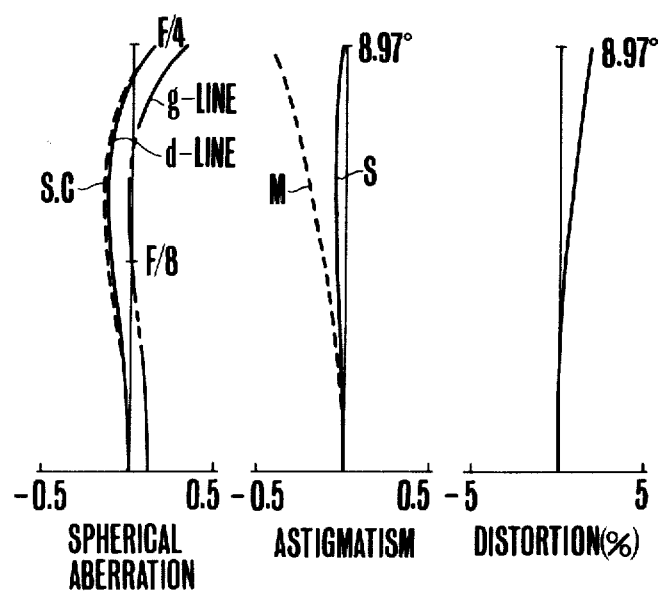

FIGS. 1 to 3 depict the lens configuration of a zoom lens according to the present invention. The zoom lens comprises, from front to rear, a positive first lens group I for focusing purposes, a negative second lens group II for magnification varying purposes, a positive third lens group III for image shift compensating purposes of which the trace of movement is concave to the front, fourth and fifth lens groups IV and V for image forming purposes, the fourth lens group IV consisting of at least one positive lens of strong forward convexity, and a negative lens, and the fifth lens group V consisting of a negative meniscus lens of rearward convexity and a positive lens. Letting $\phi 4$ denote the refractive power of the 4th group, $\phi 4,5$ the overall refractive power of the 4th and 5th groups, $\phi 4s$ the refractive power of the first surface of the positive lens in the 4th group, N4p the refractive index of the positive lens in the 4th group (or when the positive lens is plural in number, the mean value of the indices thereof), N4n the refractive index of the negative lens, N5n the refractive index of the negative lens in the 5th group, and $\nu 5p$ the Abbe number of the positive lens in the 5th group, the following conditions are satisfied:

$$0.7 < \phi 4,5/\phi 4 < 0.85 \tag{1}$$

$$1.5 < \phi 4s/\phi 4,5 < 2.2 \tag{2}$$

$$N4n > N4p \tag{3}$$

$$1.76 < N5n < 1.85 \tag{4}$$

$$30 < \nu 5p < 45 \tag{5}$$

In the embodiments, the 1st group consists of a positive doublet of negative and positive lenses cemented together at their adjoining surfaces, and a positive singlet arranged in this order from the front, the 2nd group consists of a negative singlet and a negative doublet of negative and positive lenses cemented together at their adjoining surfaces, arranged in this order from the front, and the 3rd group consists of a positive doublet of either positive and negative, or negative and positive lenses cemented together at their adjoining surfaces, arranged in this order from the front, whereby the forward or rearward straight axial movement of the 2nd group is concurrent with the reciprocating, or backward followed by forward movement of the 3rd group, as returning to the front. In the 1st and 3rd embodiments, the 4th group consists of one positive singlet and a biconcave singlet. In the 2nd embodiment, it consists of two positive singlets and a biconcave singlet.

Of the above-described conditional formulae, (1) concerns with the refractive power distribution over the fixed assembly and represents a condition in which the fixed assembly is converted to the telephoto type and the total length is shortened, and (2) to (5) represent conditions in which the deterioration of aberrations resulting from the determination of the power distribution of the fixed assembly under the framework of condition (1) is compensated for so that the state of correction of the image aberrations remains excellent.

The upper limit of inequality (1) is to make smaller the telephoto ratio of the fixed assembly itself than 0.9. When the upper limit is exceeded, though it is advantageous to the aberrational correction, the compactness will be lacked. On the other hand, when the lower limit is exceeded, the Petzval sum is increased in the negative sense with the result that the field curvature is over-corrected, the astigmatism also becomes large, and at the same time the zonal spherical aberration becomes large too. Therefore, even though the other conditions (2) to (5) are satisfied, the aberrational correction becomes difficult to perform.

Conditions (2), (3) and (4) compensate for the over-corrected field curvature resulting from the increase in the negative sense of the Petzval sum due to a shortening of the total length of the system, thus achieving an increase of the power of the 4th group without causing the deterioration of spherical aberration.

Inequality (2) defines the configuration of the positive lens constituting part of the 4th group. As the refractive power of the 4th group increases, the zonal spherical aberration tends to increase. To compensate for this, it is the common practice to increase the refractive index of the glass of which the positive lens is made up. However, this method has a side effect that the Petzval sum increases in the negative sense, resulting in the deterioration of the field curvatuve. Therefore, it is required that whilst the refractive index of this glass is maintained relatively low, a proper configuration be set forth. When the upper limit of inequality (2) is exceeded, the zonal spherical aberration becomes objectionable with the lowering of the resolving power. When the lower limit is exceeded, the spherical aberration is over-corrected and the contrast is lowered.

Inequality (3) defines the relationship of the refractive indices of the glasses of which the positive and negative lenses of the 4th lens group are made up. By selecting a glass of a higher refractive index for use in making up the negative lens in the 4th group, the Petzval sum is prevented from increasing in the negative sense, and the air lens defined by the positive and negative lenses is increased in the refractive power to correct spherical aberration and coma. (4) also contributes to prevent the increase of the Petzval sum in the negative sense by similar means of making high the refractive index of the negative lens in the 5th group.

(5) concerns with the correction of chromatic aberrations of the entire system. As the aberrational correction is carried out under conditions (1) to (4), when the upper limits are violated, both of the longitudinal and transverse chromatic aberrations are under-corrected. When the lower limits are violated, both of the longitudinal and transverse chromatic aberrations are over-corrected.

In order further to shorten the variable magnification assembly and to maintain a good state of correction of the aberrations throughout the zooming range, it is preferred that the following conditions are satisfied in combination:

$$0.15 < |f/2/ft| < 0.17 \tag{6}$$

$$1.78 < N2p < 1.85 \tag{7}$$

where f2 is the focal length of the 2nd group; N2p is the refractive index of the positive lens of the doublet in the 2nd group; and ft is the longest focal length of the entire system.

Inequality (6) is a condition for shortening the variable magnification assembly. By making the ratio of the focal length of the 2nd group (variator) to the longest focal length as small as possible, a larger rate of magnification change can be obtained for an equivalent movement. When the upper limit is exceeded, there will be a loss in compactness. When the lower limit is exceeded, the spherical aberration and coma ascribable to the 2nd group are varied to so large extent that the aberration becomes difficult to perform. Further, at the same time, the eccentricity of the lens and other manufacturing errors give rise to the production of aberrations also in a high possibility, so that the manufacturing process becomes time consuming, and costs much labor, thus suffering from a large disadvantage. (7) is a condition of correcting coma in the middle focal length positions under (6) condition. When the value of N2p is small, outward coma is produced in the middle positions, giving a very bad influence on the resolving power of the lens.

Next, examples of specific lenses are listed. Example 1 is a zoom lens having f=71-205 with the fixed assembly comprising four components. Example 2 is a zoom lens having f=71-205 with the fixed assembly comprising five components. Example 3 is an example of modification of the variable magnification assembly. Their F-numbers each are 4, and the telephoto ratios of the fixed assemblies are less than 0.91. Moreover, since the variable magnification assembly is constructed to compactness, the telephoto ratio of the entire system is less than 0.93, thus providing a shorter zoom lens than was heretofore impossible.

Example 1

| | | | f = 70.55–205.31 | F/4 | | |
|---|---|---|---|---|---|---|
| Surface No. | | | r | d | nd | vd |
| I<br>f = 108.33 | | 1 | 144.296 | 2.8 | 1.80518 | 25.4 |
| | | 2 | 67.895 | 6.6 | 1.61272 | 58.7 |
| | | 3 | −4571.825 | 0.2 | | |
| | | 4 | 94.482 | 4.7 | 1.61272 | 58.7 |
| | | 5 | 26667.449 | d$_5$ = variable | | |
| II<br>f = −34.02 | | 6 | 464.312 | 1.5 | 1.713 | 53.9 |
| | | 7 | 40.285 | 4.2 | | |
| | | 8 | −45.202 | 1.5 | 1.713 | 53.9 |
| | | 9 | 44.784 | 3.4 | 1.84666 | 23.0 |
| | | 10 | −3270.421 | d$_{10}$ = variable | | |
| III<br>f = 94.26 | | 11 | 108.4 | 5.8 | 1.51633 | 64.1 |
| | | 12 | −32.441 | 1.5 | 1.7552 | 27.5 |
| | | 13 | −56.830 | d$_{13}$ = variable | | |
| IV<br>f = 87.19 | | 14 | 36.187 | 4.5 | 1.61272 | 58.7 |
| | | 15 | 797.679 | 1.95 | | |
| | | 16 | −213.357 | 2 | 1.80518 | 25.4 |

Example 1-continued $f = 70.55–205.31 \quad F/4$

| | | | | | |
|---|---|---|---|---|---|
| | 17 | 570.712 | 47.33 | | |
| | 18 | −19.993 | 2 | 1.8061 | 40.9 |
| V | 19 | −42.359 | 0.3 | | |
| f = 150.35 | 20 | 172.917 | 3.5 | 1.59551 | 39.2 |
| | 21 | −61.717 | | | |

| | f | | |
|---|---|---|---|
| di | 70.55 | 137.04 | 205.31 |
| d₅ | 0.50 | 32.54 | 43.86 |
| d₁₀ | 34.12 | 17.63 | 0.68 |
| d₁₃ | 18.62 | 3.07 | 8.70 |

Example 2

$f = 70.08–204.45 \quad F/4$

| | Surface No. | r | d | nd | νd |
|---|---|---|---|---|---|
| I | 1 | 174.085 | 3.00 | 1.80518 | 25.4 |
| f = 108.37 | 2 | 74.284 | 6.33 | 1.61272 | 58.7 |
| | 3 | −600.585 | 0.2 | | |
| | 4 | 92.882 | 4.63 | 1.61272 | 58.7 |
| | 5 | 1834.330 | d₅ = variable | | |
| II | 6 | 674.462 | 1.50 | 1.71300 | 53.9 |
| f = −34 | 7 | 41.276 | 4.20 | | |
| | 8 | −48.238 | 1.50 | 1.71300 | 53.9 |
| | 9 | 37.326 | 3.90 | 1.80518 | 25.4 |
| | 10 | 6553.094 | d₁₀ = variable | | |
| III | 11 | 102.552 | 5.07 | 1.51633 | 64.1 |
| f = 93.89 | 12 | −34.933 | 1.50 | 1.75520 | 27.5 |
| | 13 | −60.262 | d₁₃ = variable | | |
| | 14 | 34.997 | 4.00 | 1.51633 | 64.1 |
| | 15 | 122.331 | 0.20 | | |
| IV | 16 | 43.163 | 3.00 | 1.51633 | 64.1 |
| f = 94.43 | 17 | 92.608 | 7.25 | | |
| | 18 | −838.758 | 1.50 | 1.80518 | 25.4 |
| | 19 | 109.555 | 38.64 | | |
| | 20 | −18.256 | 1.50 | 1.7725 | 49.6 |
| V | 21 | −28.964 | 0.15 | | |
| f = −213.93 | 22 | 77.498 | 3.00 | 1.5927 | 35.3 |
| | 23 | −310.218 | | | |

| | f | | |
|---|---|---|---|
| di | 70.08 | 136.57 | 204.45 |
| d₅ | 0.59 | 32.92 | 44.24 |
| d₁₀ | 34.13 | 17.63 | 0.77 |
| d₁₃ | 18.83 | 3.01 | 8.55 |

Example 3

$f = 70.13–207.58 \quad F/4$

| | Surface No. | r | d | nd | νd |
|---|---|---|---|---|---|
| I | 1 | 173.058 | 2.8 | 1.80518 | 25.4 |
| f = 101.07 | 2 | 72.287 | 6.6 | 1.61272 | 58.7 |
| | 3 | −519.949 | 0.2 | | |
| | 4 | 85.883 | 4.7 | 1.61272 | 58.7 |
| | 5 | 1980.009 | d₅ = variable | | |
| II | 6 | 469.026 | 1.5 | 1.713 | 53.9 |
| f = −34 | 7 | 40.848 | 4.2 | | |
| | 8 | −46.589 | 1.5 | 1.713 | 53.9 |
| | 9 | 43.733 | 3.4 | 1.84666 | 23.9 |
| | 10 | 1809.546 | d₁₀ = variable | | |
| III | 11 | 70.413 | 1.5 | 1.80518 | 25.4 |
| f = 99.57 | 12 | 37.970 | 5.8 | 1.55963 | 61.2 |
| | 13 | −108.476 | d₁₃ = variable | | |
| | 14 | 37.23 | 4.5 | 1.6425 | 58.4 |
| IV | 15 | 235.372 | 7.3 | | |
| f = 96.22 | 16 | −213.357 | 2 | 1.80518 | 25.4 |
| | 17 | 625.449 | 44.75 | | |
| | 18 | −20.642 | 2 | 1.8061 | 40.9 |
| V | 19 | −33.727 | 0.3 | | |
| f = −225.63 | 20 | 105.767 | 3.5 | 1.59551 | 39.2 |
| | 21 | −154.221 | | | |

| | f | | |
|---|---|---|---|
| di | 70.13 | 120.82 | 207.58 |
| d₅ | 1.06 | 25.69 | 39.93 |
| d₁₀ | 39.07 | 24.84 | 0.46 |
| d₁₃ | 13.44 | 3.05 | 13.18 |

| | Example 1 | Example 2 | Example 3 |
|---|---|---|---|
| φ | 0.01147 | 0.01059 | 0.010393 |
| φ4,5 | 0.008445 | 0.008465 | 0.008384 |
| φ4,5/φ4 | 0.736 | 0.799 | 0.807 |
| φ4s | 0.01693 | 0.01475 | 0.01726 |
| f2 | −34.02 | −34 | −34 |
| \|f2/f1\| | 0.166 | 0.166 | 0.164 |
| Telephoto Ratio (Relay Lens) | 0.881 | 0.874 | 0.908 |
| Telephoto Ratio (Entire System) | 0.924 | 0.915 | 0.927 |

What is claimed is:

1. A compact zoom lens comprising:
  a first group having a positive refractive power, including a cemented positive lens of a negative lens and a positive lens, and a positive lens, and movable for focusing;
  a second group having a negative refractive power, comprising a negative lens and a cemented negative lens of a negative lens and a positive lens, and movable for variation of magnification;
  a third group having a positive refractive power, comprising a cemented positive lens of a positive lens and a negative lens, and movable for compensation along with the second group; and
  an image forming lens having a positive refractive power, positioned to the rear of the third group on an optical axis, and consisting of fourth and fifth groups,
  said fourth group including, from front to rear, at least one positive lens with its front surface covex toward the front, and a negative lens; and
  said fifth group consisting of, from front to rear, a negative meniscus lens of rearward convexity, and a positive lens,
  said zoom lens satisfying the following conditions:

$0.7 < \phi 4,5/\phi 4 < 0.85$ \hfill (1)

$1.5 < \phi 4s/\phi 4,5 < 2.2$ \hfill (2)

$N4n > N4p$ \hfill (3)

$1.76 < N5n < 1.85$ \hfill (4)

$30 < \nu 5p < 45$ \hfill (5)

where
  $\phi 4$ is the refractive power of said fourth group;
  $\phi 4,5$ is the overall refractive power of said fourth and fifth groups;
  $\phi 4s$ is the refractive power of the first surface of the positive lens of said fourth group;
  N4p is the refractive index of the positive lens in said fourth group (when the positive lens is plural in number, the average value thereof);
  N4n is the refractive index of the negative lens in said fourth group;

N5n is the refractive index of the negative lens in said fifth group; and

ν5p is the Abbe number of the positive lens of said fifth group.

2. A compact zoom lens as described in claim 1, further satisfying following conditions:

$$0.15 < |f2/ft| < 0.17 \qquad (1)$$

$$1.78 < N2p < 1.85 \qquad (2)$$

where
- f2: the focal length of said 2nd group;
- N2p: the refractive index of the positive lens in the cemented negative lens of said second group; and
- ft: the longest focal length of the zoom lens entire system.

* * * * *